US012633774B2

(12) United States Patent
Joo et al.

(10) Patent No.: US 12,633,774 B2
(45) Date of Patent: May 19, 2026

(54) WIRELESS POWER TRANSMISSION APPARATUS AND METHOD FOR CONTROLLING SAME

(71) Applicant: SAMSUNG ELECTRONICS CO., LTD., Suwon-si (KR)

(72) Inventors: Sungyong Joo, Suwon-si (KR); Jeongil Kang, Suwon-si (KR); Sungbum Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 17/900,277

(22) Filed: Aug. 31, 2022

(65) Prior Publication Data

US 2023/0006475 A1      Jan. 5, 2023

Related U.S. Application Data

(63) Continuation of application No. PCT/KR2021/004856, filed on Apr. 19, 2021.

(30) Foreign Application Priority Data

Apr. 28, 2020    (KR) ........................ 10-2020-0051769

(51) Int. Cl.
*H02J 50/90*      (2016.01)
*A47B 21/06*      (2006.01)
(Continued)

(52) U.S. Cl.
CPC .............. *H02J 50/10* (2016.02); *A47B 21/06* (2013.01); *H01F 38/14* (2013.01); *H02J 7/0044* (2013.01);
(Continued)

(58) Field of Classification Search
CPC ....................................................... H02J 50/90
(Continued)

(56) References Cited

U.S. PATENT DOCUMENTS

| | | | |
|---|---|---|---|
| 7,819,329 | B2 | 10/2010 | Lu et al. |
| 8,248,028 | B2 | 8/2012 | Toya et al. |

(Continued)

FOREIGN PATENT DOCUMENTS

| | | |
|---|---|---|
| CN | 101059880 | 10/2007 |
| CN | 102082469 | 6/2011 |

(Continued)

OTHER PUBLICATIONS

International Search Report for PCT/KR2021/004856 mailed Aug. 6, 2021 w/ English Translation, 4 pages.
(Continued)

*Primary Examiner* — Ahmed H Omar
(74) *Attorney, Agent, or Firm* — Nixon & Vanderhye P.C.

(57) ABSTRACT

A wireless power transmission apparatus is disclosed. The wireless power transmission apparatus comprises: a first plate having a first polarity, a second plate spaced apart from the first plate and having a second polarity different from the first polarity, at least one wireless power transmission module disposed between the first plate and the second plate and connected to one side of the first plate and one side of the second plate, and a processor configured to control the wireless power transmission module, wherein the processor is configured to move the wireless power transmission module to a location corresponding to one area between the first plate and the second plate based on a wireless power receipt apparatus being identified in one area of another side of the second plate.

20 Claims, 14 Drawing Sheets

(51) Int. Cl.

| | |
|---|---|
| *H01F 38/14* | (2006.01) |
| *H02J 7/00* | (2006.01) |
| *H02J 50/10* | (2016.01) |
| *H02J 50/40* | (2016.01) |
| *H02J 50/80* | (2016.01) |

(52) U.S. Cl.
CPC .............. *H02J 50/40* (2016.02); *H02J 50/80* (2016.02); *H02J 50/90* (2016.02); *A47B 2021/066* (2013.01)

(58) Field of Classification Search
USPC ........................................................ 320/108
See application file for complete search history.

(56) References Cited

U.S. PATENT DOCUMENTS

| | | | |
|---|---|---|---|
| 8,305,036 | B2 | 11/2012 | Toya et al. |
| 8,729,735 | B2 | 5/2014 | Urano |
| 8,947,041 | B2 | 2/2015 | Cook et al. |
| 9,178,369 | B2 | 11/2015 | Partovi |
| 9,608,247 | B2 | 3/2017 | Kakeya et al. |
| 10,067,481 | B2 | 9/2018 | An et al. |
| 10,447,064 | B2* | 10/2019 | Chi ........................ H04B 5/263 |
| 11,005,309 | B2* | 5/2021 | Bober ................... H02J 50/005 |
| 11,894,697 | B2 | 2/2024 | Kyeong |
| 2007/0133207 | A1* | 6/2007 | Pryor ..................... F21V 21/35 |
| | | | 362/253 |
| 2010/0270970 | A1* | 10/2010 | Toya .................... H02J 7/0042 |
| | | | 320/108 |
| 2011/0074344 | A1 | 3/2011 | Park et al. |
| 2011/0109264 | A1 | 5/2011 | Choi |
| 2015/0097519 | A1* | 4/2015 | Chen ........................ H02J 7/02 |
| | | | 320/108 |
| 2015/0229156 | A1* | 8/2015 | Iwabuchi ................ H02J 50/90 |
| | | | 320/108 |
| 2017/0182903 | A1* | 6/2017 | Kwasnick ............. B60L 53/122 |
| 2019/0052114 | A1* | 2/2019 | Lee ......................... H02J 50/27 |
| 2019/0267828 | A1 | 8/2019 | Goodchild et al. |
| 2020/0203995 | A1* | 6/2020 | Osada ..................... H02J 50/12 |

FOREIGN PATENT DOCUMENTS

| | | |
|---|---|---|
| CN | 102144239 | 8/2011 |
| CN | 102756625 | 10/2012 |
| CN | 102969751 | 3/2013 |
| CN | 105186646 | 12/2015 |
| CN | 106333837 | 1/2017 |
| EP | 3326258 | 12/2018 |
| JP | 5340017 | 8/2013 |
| JP | 2016-111791 | 6/2016 |
| KR | 10-2011-0034773 | 4/2011 |
| KR | 10-2011-0050831 | 5/2011 |
| KR | 10-2013-0095124 | 8/2013 |
| KR | 10-1568671 | 11/2015 |
| KR | 10-2016-0103471 | 9/2016 |
| KR | 10-2018-0036010 | 4/2018 |
| KR | 10-2019-0072484 | 6/2019 |
| KR | 10-2019-0075427 | 7/2019 |

OTHER PUBLICATIONS

Written Opinion of the ISA mailed Aug. 6, 2021 w/ English Translation, 10 pages.
Notice of Allowance issued Feb. 5, 2025 in Korean Patent Application No. 10-2020-0051769.

* cited by examiner

WIRELESS POWER TRANSMISSION APPARATUS AND METHOD FOR CONTROLLING SAME

CROSS-REFERENCE TO RELATED APPLICATIONS

This application is a continuation of International Application No. PCT/KR2021/004856 designating the United States, filed on Apr. 19, 2021, in the Korean Intellectual Property Receiving Office and claiming priority to Korean Patent Application No. 10-2020-0051769, filed on Apr. 28, 2020, in the Korean Intellectual Property Office, the disclosures of which are incorporated by reference herein in their entireties.

BACKGROUND

Field

The disclosure relates to a wireless power transmission apparatus and a method for controlling thereof. For example, the disclosure relates to a wireless power transmission apparatus including a wireless power transmission module and a method for controlling thereof.

Description of Related Art

Wireless power transfer refers to a technology that can transmit power without wires. It is also referred to as Wi-power by comparing it to Wi-Fi technology that allows users to access the Internet wirelessly anytime and anywhere.

For wireless power transmission and reception methods, there are various methods, such as the Inductive Power Transfer System (IPTS) method used for wireless charging of smartphones, the Coupled Magnetic Resonance System (CMRS) method being promoted for use in electric vehicles, high-speed trains, or the like, and the long-distance microwave method, which is being developed for use in space solar power generation.

Recently, with the development of electronic technology, there is a movement to improve the inconvenience of a wired connection, and to apply the wireless power transmission technology to various types of electronic apparatuses in terms of interiors.

For wireless charging, a pad, for example, a charging pad including a transmission coil (Tx Coil), etc. must be provided, and as the number of electronic apparatuses for performing wireless charging increases, the charging pad also increases proportionally. In addition, since wireless charging is possible only when adjacent to the charging pad, there is a problem in that a movement of the electronic apparatus is limited during charging.

Accordingly, there has been a demand for a device for easily supplying wireless power to a plurality of electronic apparatuses without restrictions on the number of chargeable devices and movement.

SUMMARY

Embodiments of the disclosure provide a wireless power supply apparatus for supplying wireless power and a method for controlling thereof.

Technical Solution

According to an example embodiment, a wireless power transmission apparatus includes: a first plate having a first polarity, a second plate spaced apart from the first plate and having a second polarity different from the first polarity, at least one wireless power transmission module including circuitry placed between the first plate and the second plate and connected to one side of the first plate and one side of the second plate, and a processor configured to control the wireless power transmission module, wherein the processor is configured to: based on a wireless power receipt apparatus being identified in one area on another side of the second plate, move the wireless power transmission module to a location corresponding to the one area between the first plate and the second plate.

The wireless power transmission module may include a driver comprising a motor configured to receive power from the first plate and the second plate, and wherein the processor is configured to transmit a driving signal for moving the wireless power transmission module to the location to the wireless power transmission module.

The wireless power transmission module may include: a transmission coil configured to transmit power supplied from the first plate and the second plate to a receiving coil included in the wireless power receipt apparatus through the transmission coil.

The apparatus may include: a touch sensor disposed on another side of the second plate, wherein the processor is configured to identify the one area on another side of the second plate in which the wireless power receipt apparatus is located based on sensed data received from the touch sensor.

The at least one wireless power transmission module includes: a plurality of wireless power transmission modules, and wherein the processor is configured to: based on the wireless power receipt apparatus being identified in each of a plurality of areas on another side of the second plate, move the plurality of wireless power transmission modules to the plurality of areas, respectively.

The processor may be configured to, based on wireless charging with respect to the wireless power receipt apparatus in one area on another side of the second plate being completed, move the wireless power transmission apparatus module to another wireless power receipt apparatus on standby located in another area.

The processor may be configured to, based on the another wireless power receipt apparatus on standby not existing, move the wireless power transmission apparatus to a specified area between the first plate and the second plate.

The second plate may include a plurality of holes arranged in a grid pattern, wherein the wireless power transmission module is configured to be connected to one side of the first plate and one side of the second plate through a connecting member, wherein the connecting member includes a fixing part fixed to one of the plurality of holes and a supporting part supporting the fixing part, wherein the supporting part is configured to, based on the fixing part being fixed to another one of the plurality of holes based on a movement of the wireless power transmission module in a state in which the fixing part is fixed to one of the plurality of holes, maintain the wireless power transmission module at a location corresponding to another one of the plurality of holes.

The apparatus my further include a communication interface comprising a circuit, wherein the processor is configured to: control the communication interface to communicate with the wireless power receipt apparatus, and move the wireless power transmission apparatus based on location information of the wireless power receipt apparatus received through the communication interface.

The apparatus my further include a communication interface comprising a circuit, wherein the at least one wireless power transmission module includes a plurality of wireless power transmission modules, wherein the processor is configured to: identify the number of wireless power transmission modules required for charging the wireless power receipt apparatus based on power consumption information of the wireless power receipt apparatus received through the communication interface, and move the identified number of wireless power transmission apparatus modules to a location corresponding to the wireless power receipt apparatus.

The wireless power transmission apparatus may include at least one of a charging table or a wall-mounted charging cradle having the second plate on a front side and the first plate on a rear side.

According to an example embodiment of the disclosure, a method of controlling a wireless power transmission apparatus comprising a first plate having a first polarity, a second plate spaced apart from the first plate and having a second polarity different from the first polarity, at least one wireless power transmission module disposed between the first plate and the second plate and connected to one side of the first plate and one side of the second plate, the method includes: identifying a wireless power receipt apparatus in one area on another side of the second plate, and moving the wireless power transmission module to a location corresponding to the one area between the first plate and the second plate.

The wireless power transmission module may include a driver configured to receive power from the first plate and the second plate, and wherein the moving includes: transmitting a driving signal for moving the wireless power transmission module to the location to the wireless power transmission module.

The wireless power transmission module may include a transmission coil, and the method further includes transmitting power supplied from the first plate and the second plate to a receiving coil included in the wireless power receipt apparatus through the transmission coil.

The identifying the wireless power transmission receipt apparatus may include: identifying the one area on another side of the second plate in which the wireless power receipt apparatus is located based on sensed data received from a touch sensor placed on another side of the second plate.

The at least one wireless power transmission module includes a plurality of wireless power transmission modules, and wherein the moving may include, based on the wireless power receipt apparatus being identified in each of a plurality of areas on another side of the second plate, moving the plurality of wireless power transmission modules to the plurality of areas, respectively.

The moving may include, based on wireless charging with respect to the wireless power receipt apparatus in one area on another side of the second plate being completed, moving the wireless power transmission apparatus module to another wireless power receipt apparatus on standby located in another area.

The moving may include, based on the another wireless power receipt apparatus on standby not existing, moving the wireless power transmission apparatus to a specified area between the first plate and the second plate.

The second plate may include a plurality of holes arranged in a grid pattern, wherein the wireless power transmission module is configured to be connected to one side of the first plate and one side of the second plate through a connecting member, wherein the connecting member includes a fixing part fixed to one of the plurality of holes and a supporting part supporting the fixing part, wherein the supporting part is configured to, based on the fixing part being fixed to another one of the plurality of holes based on a movement of the wireless power transmission module in a state in which the fixing part is fixed to one of the plurality of holes, maintain the wireless power transmission module at a location corresponding to another one of the plurality of holes.

The method may further include receiving location information of the wireless power receipt apparatus by performing communication with the wireless power receipt apparatus, wherein the moving includes moving the wireless power transmission module based on the location information.

According to various example embodiments of the disclosure, the wireless power transmission module may move to a location of an electronic apparatus to supply wireless power without the need for the electronic apparatus to be fixed at a specific location.

According to various example embodiments of the disclosure, even when a plurality of electronic apparatuses are mounted, wireless power may be supplied to each of the plurality of electronic apparatuses.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
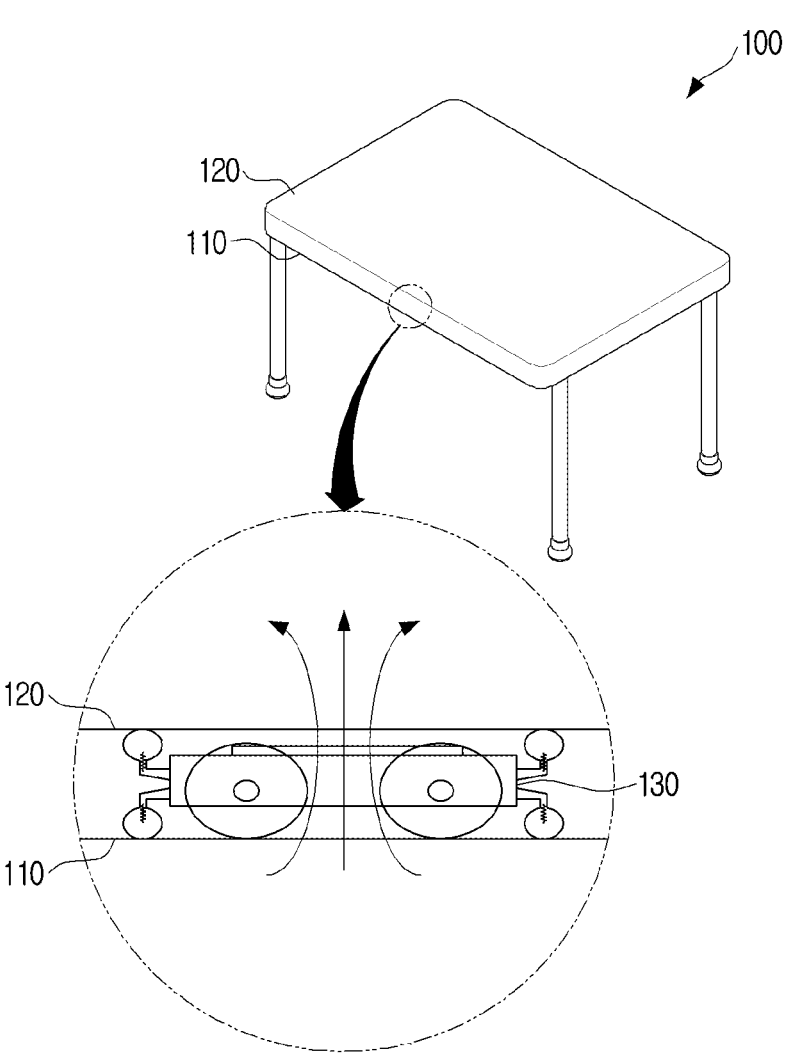
FIG. 1A is a diagram illustrating an example configuration of a wireless power transmission apparatus according to various embodiments.

The terms used in describing various example embodiments will be briefly explained, and various example embodiments will be described in greater detail with reference to the accompanying drawings.

Terms used in the disclosure are selected as general terminologies currently widely used in consideration of the configuration and functions of the disclosure, but may be different depending on intention of those skilled in the art, a precedent, appearance of new technologies, or the like. Further, in specific cases, terms may be arbitrarily selected. In that instance, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the example embodiments to a specific embodiment form. Instead, modifications, equivalents and replacements included in the disclosed concept and technical scope of this disclosure may be employed. While describing various example embodiments, if it is identified that the specific description regarding a known technology obscures the gist of the disclosure, the specific description may be omitted.

The terms such as "first," "second," and so on may be used to describe a variety of elements, but the elements should not be limited by these terms. The terms used herein are simply intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, various example embodiments may be realized in a variety of different configurations, and not limited to descriptions provided herein. Also, well-known functions or constructions may not be described in detail where they would obscure the disclosure with unnecessary detail.

FIG. 1A is a diagram illustrating an example configuration of a wireless power transmission apparatus according to various embodiments.

Referring to FIG. 1A, according to an embodiment of the disclosure, a wireless power transmission apparatus 100 may be implemented as a component of table-type furniture. However, this is only an example and is not limited thereto. For example, the wireless power transmission apparatus 100 may be implemented as one component such as various types of furniture, interior accessories, household items, or the like. As an example, the wireless power transmission apparatus 100 may be implemented as a component on an armrest of a sofa, a chair, or the like. As another example, the wireless power transmission apparatus 100 may be implemented as a wall-mounted cradle. In that configuration, when a wireless power receipt apparatus (not shown) is mounted on the wall-mounted cradle, the wireless power transmission apparatus 100 may wirelessly transmit power to the corresponding wireless power receipt apparatus.

As another example, the wireless power transmission apparatus 100 may be implemented as one component of various types of electronic apparatuses. For example, the wireless power transmission apparatus 100 may be implemented as one component of a display device. In that configuration, when the wireless power receipt apparatus is identified, the display device may transmit power wirelessly through the corresponding wireless power transmission apparatus 100.

The wireless power transmission apparatus 100 according to an embodiment of the disclosure may be connected to a power outlet where a power line provides commercial power (e.g., 90 to 264V), and the wireless power transmission apparatus 100 may transmit the commercial power to a wireless power receipt apparatus 200. Meanwhile, the wireless power receipt apparatus 200 (e.g., refer to FIG. 4) may receive power wirelessly transmitted from the wireless power transmission apparatus 100 (or generate a voltage by induced electromotive force) and consume the power by itself or provide the power to an external electronic apparatus 300.

As shown in FIG. 1A, the wireless power transmission apparatus 100 according to an embodiment of the disclosure may include a first plate 110 having a first polarity, a second plate 120 having a second polarity different from the first polarity, and at least one wireless power transmission module (e.g., including various circuitry) 130 for wirelessly transmitting power.

The first plate 110 according to an embodiment may be implemented as a thin conductive plate through which electricity can pass. For example, the first plate 110 may be implemented as a copper plate. According to an embodiment, the first plate 110 may be implemented as a negative plate having a negative (−) polarity.

The second plate 120 according to an embodiment may be implemented as a thin conductive plate through which electricity can pass. For example, the second plate 120 may be implemented as a copper plate. The second plate 120 according to an embodiment of the disclosure may be spaced apart from the first plate 110, and the second plate 120 may have a second polarity different from the first polarity.

An embodiment of the first plate 110 and the second plate 120 according to an embodiment of the disclosure will be described in greater detail below with reference to FIG. 1B.

Figure 1B:
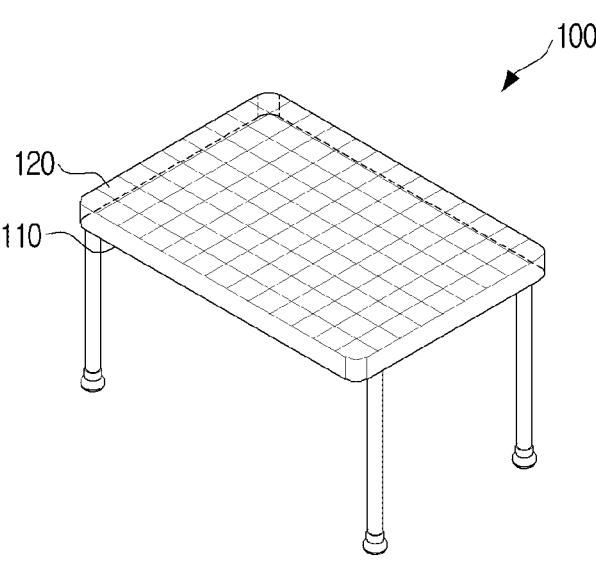
FIG. 1B is a diagram illustrating first and second plates according to various embodiments.

FIG. 1B is a diagram illustrating first and second plates according to various embodiments.

Referring to FIG. 1B, the first plate 110 may be implemented in a plate shape, and the second plate 120 may be implemented in a grid shape including a plurality of holes. For example, the second plate 120 may include a plurality of holes, and each of the plurality of holes may be implemented with a certain size to enable mounting or fixing of one component (e.g., a connection member) of the wireless power transmission module 130.

As another example, each of the first plate 110 and the second plate 120 may be implemented in a grid shape including a plurality of holes. A description thereof will be described in greater detail below with reference to FIG. 8.

According to an embodiment, the second plate 120 may be implemented as an anode plate (positive plate) having a positive (+) polarity. Referring to FIG. 1B, when the wireless power transmission apparatus 100 is implemented as a table, the first plate 110 may be provided on one side of a bottom of the table, and the second plate 120 may be provided on one surface, which is spaced apart from the first plate 110, of a top of the table. However, this is only an example and is not limited thereto. For example, the first plate 110 may be implemented as a positive electrode plate having a positive (+) polarity, and the second plate 120 may be implemented as a negative electrode plate having a negative (−) polarity. The negative electrode plate may be referred to as a ground plate, a ground (Gnd), or the like, but it will be collectively referred to as a negative electrode plate for convenience of description.

Returning to FIG. 1A, the wireless power transmission apparatus 110 according to an embodiment of the disclosure may include at least one wireless power transmission module 130. The wireless power transmission module 130 according to an embodiment may be placed between the first plate 110 and the second plate 120.

The wireless power transmission module 130 according to an embodiment may be connected to one side of the first plate 110 and one side of the second plate 120. Referring to FIG. 1, the wireless power transmission module 130 placed between the first plate 110 placed on the bottom of the table and the second plate 120 placed on the top of the table, and may be connected to one side of the first plate 110 and one side of the second plate 120, respectively.

The wireless power transmission module 130 according to an embodiment of the disclosure may include an EMI filter, a PFC circuit, an inverter, a transmission coil, or the like.

The EMI filter rectifies and smooths input commercial power and outputs it as a DC voltage of a certain level. A half-wave or full-wave rectification circuit may be used for rectification, and a capacitor may be connected in parallel to an output terminal of a rectifier circuit for smoothing.

The Power Factor Correction (PFC) circuit may reduce a phase difference between the input DC voltage and the DC current through the EMI filter. Thus, a power efficiency may be increased by offsetting a reactive power component. The inverter converts the DC current output by power factor from the PFC circuit back into an AC current such that it can be used by a transmission coil (Tx Coil).

Accordingly, the transmission coil may transmit electromagnetic energy to the wireless power receipt apparatus.

Meanwhile, the wireless power transmission module 130 according to an embodiment of the disclosure may include a driver or a driving unit for moving the wireless power transmission module 130. For example, the driver may include a motor and drive the motor using power supplied from the first plate 110 and the second plate 120. Subsequently, the wireless power transmission module 130 may move a space between the first plate 110 and the second plate 120 according to the driving of the motor. A detailed description thereof will be described with reference to FIG. 2.

Figure 2:
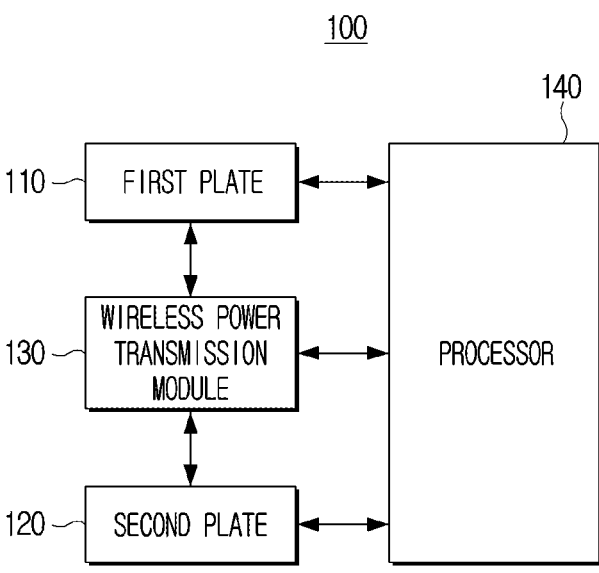
FIG. 2 is a block diagram illustrating an example configuration of a wireless power transmission apparatus according to various embodiments.

FIG. 2 is a block diagram illustrating an example configuration of a wireless power transmission apparatus according to various embodiments.

Referring to FIG. 2, the wireless power transmission apparatus 100 includes a first plate 110, a second plate 120, a wireless power transmission module (e.g., including power transmission circuitry) 130, and a processor (e.g., including processing circuitry) 140.

The processor 140 may include various processing circuitry and control the overall operation of the wireless power transmission apparatus 100.

According to an embodiment, the processor 140 may be implemented as a digital signal processor (DSP), a microprocessor, an artificial intelligence (AI), a timing controller (T-CON) that processes a digital image signal. However, it is not limited thereto, and may include one or more of a central processing unit (CPU), microcontroller unit (MCU), micro processing unit (MPU), controller, application processor (AP), or communication processor (CP), ARM processor, or may be defined with a corresponding term. In addition, the processor 140 may be implemented as a system on chip (SoC), large scale integration (LSI), or a field programmable gate array (FPGA) having a built-in processing algorithm.

For example, when a wireless power receipt apparatus is identified in an area on the other side of the second plate 120, the processor 140 according to an embodiment of the disclosure may move the wireless power transmission module 130 to a location corresponding to one area between the first plate 110 and the second plate 120.

For example, the wireless power transmission module 130 may include a main body including an EMI filter, a PFC circuit, an inverter, and a transmission coil, and a driver for moving the main body. A detailed description thereof will be described with reference to FIG. 3A.

Figure 3A:
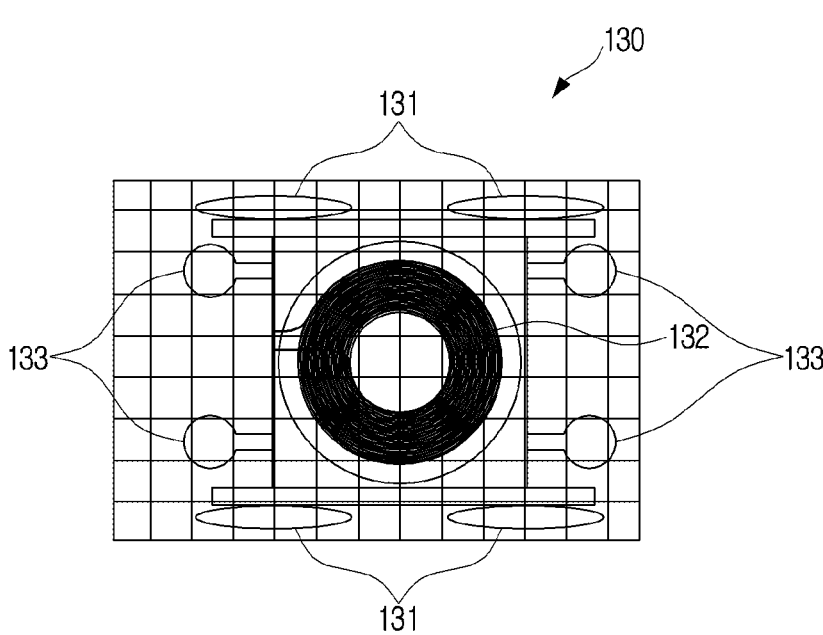
FIG. 3A is a diagram illustrating a wireless power transmission module according to various embodiments.

FIG. 3A is a diagram illustrating a wireless power transmission module according to various embodiments.

Referring to FIG. 3A, the wireless power transmission module 130 according to an embodiment of the disclosure may include a driver (e.g., including a motor) 131, a transmission coil 132, and a connection member (e.g., including a fixing part) 133.

The driver 131 according to an embodiment of the disclosure may include a motor, a wheel, or the like, and the wireless power transmission module 130 may be movable in a specific space using the driver 131. For example, the wireless power transmission module 130 may include the driver 131 movable in the space between the first plate 110 and the second plate 120 under the control of the processor 140.

Meanwhile, it is only an example that the driver 131 is implemented in a configuration including an motor, a wheel, or the like, and is not limited thereto. For example, the driver 131 may include an electromagnet according to a magnetic levitation method. In that configuration, the wireless power transmission module 130 may be movable in the space between the first plate 110 and the second plate 120 through various types of movement (or movement structures) such as rails, or the like. The wireless power transmission module 130 may move in a specific space using a suction force, a propulsion force, or the like, by an electromagnet.

The wireless power transmission module 130 according to an embodiment of the disclosure may be connected to each of the first plate 110 and the second plate 120 through the connection member 133. The wireless power transmission module 130 may use power supplied from the first plate 110 and the second plate 120 through the connection member 133 and move the driver 131 and components provided in the main body (e.g., the transmission coil 132).

Referring back to FIG. 2, the processor 140 according to an embodiment of the disclosure may identify the wireless power receipt apparatus in one area on the other side of the second plate (e.g., one area at the top of the table). The processor 140 may transmit, to the wireless power transmission module 130, a driving signal for moving the wireless power transmission module 130 to a location corresponding to an area between the first plate 110 and the second plate 120. For example, when a user terminal device having a reception coil (Rx Coil) is identified in one area of the table top, the processor 140 may transmit, to the wireless power transmission module 130, a driving signal for moving the wireless power transmission module 130 to a location corresponding to the user terminal device. The wireless power transmission module 130 may move to one area by controlling the driver 131 based on the received driving signal. As another example, the processor 140 may move the wireless power transmission module 130 to one area by directly controlling the driver 131.

Figure 3B:
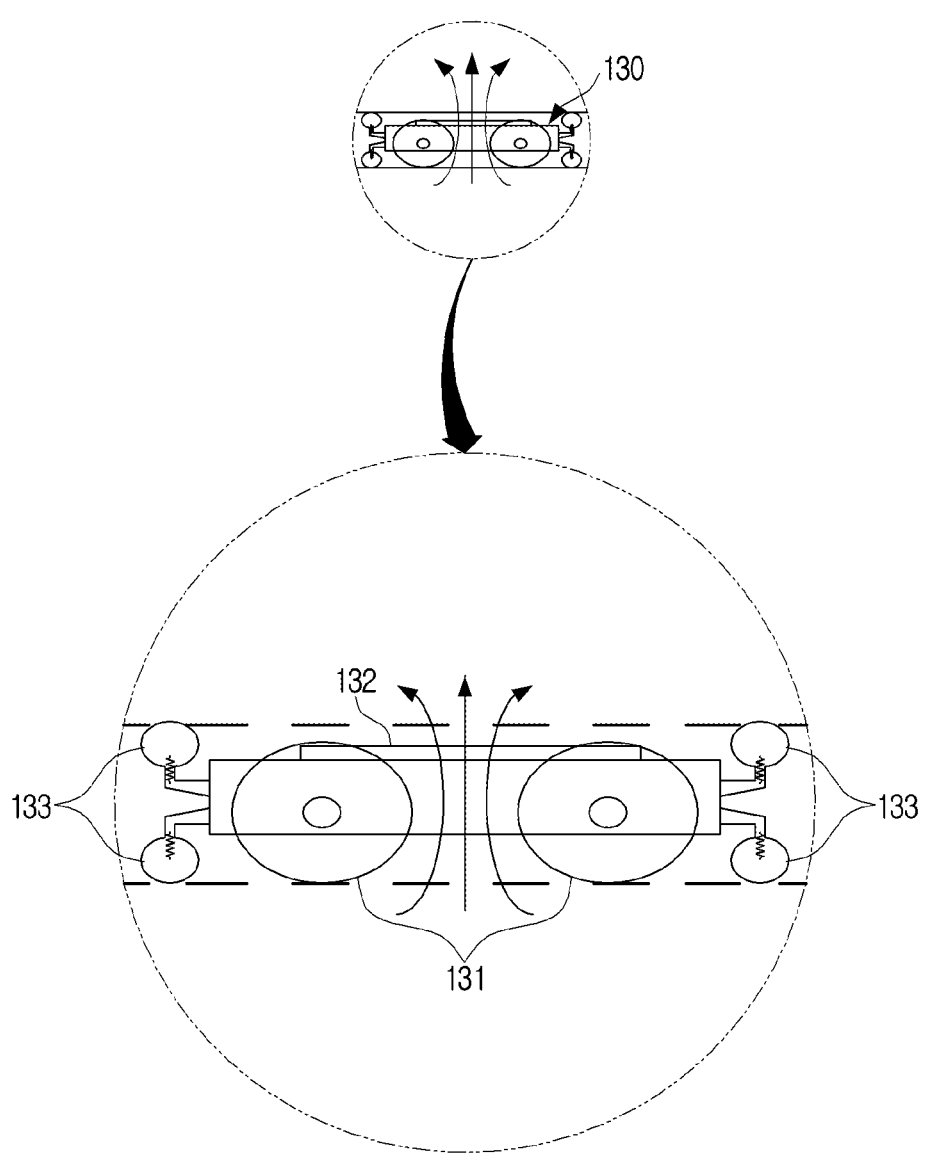
FIG. 3B is a side view illustrating a wireless power transmission module according to various embodiments.

FIG. 3B is a side view illustrating a wireless power transmission module according to various embodiments.

Referring to FIG. 3B, the wireless power transmission module 130 according to an embodiment of the disclosure may include a connection member 133, and the connection member 133 may be connected to the first plate 110 and the second plate 120, respectively, and may be supplied with power.

The transmission coil 132 provided in the wireless power transmission module 130 according to an embodiment may convert power supplied from the first plate 110 and the second plate 120 into electromagnetic energy. In order to minimize and/or reduce a loss of electromagnetic energy and smoothly transmit the electromagnetic energy to the wireless power receipt apparatus, the second plate 120 placed on an upper end of the transmission coil 132 may include a plurality of holes having a grid shape.

Referring to FIGS. 3A and 3B, a magnetic flux generated by the transmission coil 132 may pass through a plurality of holes of the second plate 120 and reach the wireless power receipt apparatus located on the other side of the second plate 120. Meanwhile, although not shown in FIG. 3B, a plywood or the like for protecting the second plate 120 may be provided without hindering the passage of magnetic flux on the other side of the second plate 120. For example, a plywood for housing the wireless power transmission apparatus 100, a protective plate of various materials, or the like, may be provided.

According to an embodiment of the disclosure, the first plate 110 may also include a plurality of holes arranged in a grid shape. Referring to FIG. 3B, the connection member 133 may be fixed to one of a plurality of holes provided in each of the first plate 110 and the second plate 120 and maintain the location of the wireless power transmission module 130. A description thereof will be provided in greater detail below with reference to FIG. 8.

As another example, the first plate 110 may be implemented as a conductive plate not including a plurality of holes, and the second plate 120 may be implemented in a grid shape including a plurality of holes. As an example, the disclosure is not limited thereto. For example, the first plate 110 and the second plate 120 may be implemented in various materials or various patterns, respectively, that do not interfere with a transmission of the magnetic flux generated by a transmission power 131.

Figure 4:
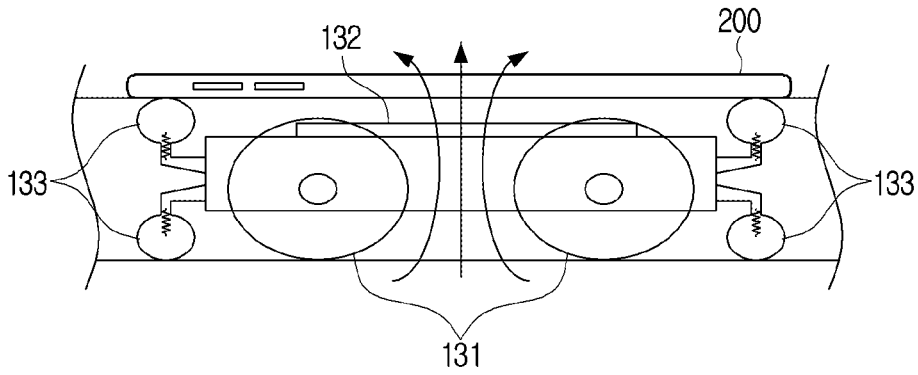
FIG. 4 is a diagram illustrating example wireless power transmission according to various embodiments.

FIG. 4 is a diagram illustrating example wireless power transmission according to various embodiments.

Referring to FIG. 4, the processor 140 may identify the wireless power receipt apparatus 200 located in an area on the other side of the second plate 120. The wireless power receipt apparatus 200 may include a receiving coil (Rx Coil).

For example, an induced electromotive force may be generated by a voltage applied to the transmission coil 132 of the wireless power transmitting apparatus 100 or a current flowing through the transmission coil. The induced electromotive force has a unit of voltage. The receiving coil of the wireless power receipt apparatus 200 may receive electromagnetic energy from the transmission coil 132. For example, the receiving coil may receive power through magnetic coupling with the transmission coil 132.

A rectifier provided in the wireless power receipt apparatus 200 may rectify the power received through the receiving coil. For example, the rectifier may generate a DC current by rectifying an AC current received by the receiving coil. The rectifier may convert AC voltage provided from the receiving coil into a DC voltage by rectifying and smoothing the AC voltage again. The wireless power receipt apparatus 200 may be driven using the rectified power.

Meanwhile, FIG. 4 illustrates a side view of the user terminal device assuming that the wireless power receipt apparatus 200 is a user terminal device for convenience of description, but the disclosure is not limited thereto. For example, the wireless power receipt apparatus 200 may include various types of electronic apparatuses capable of receiving electromagnetic energy and being driven. As an example, the wireless power receipt apparatus 200 may be implemented as a wireless earphone charger including a receiving coil, a laptop computer, a display device, a sound bar, or the like.

Figure 5:
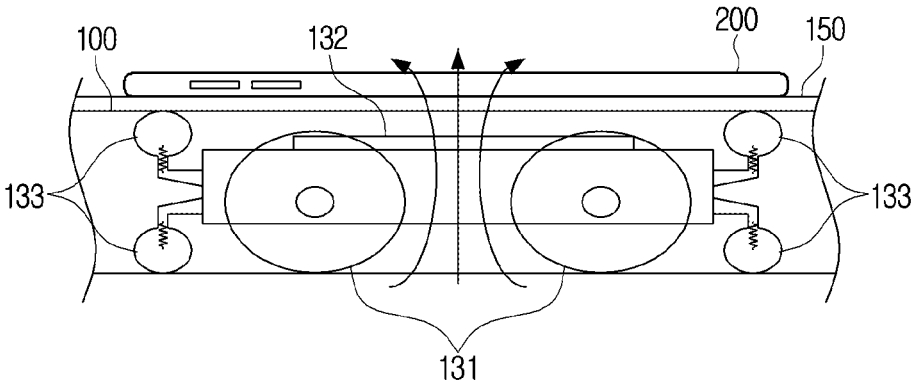
FIG. 5 is a diagram illustrating a touch sensor according to various embodiments.

FIG. 5 is a side view illustrating a touch sensor according to various embodiments.

Referring to FIG. 5, the wireless power transmission apparatus 100 according to an embodiment of the disclosure may include a touch sensor 150 placed on the other side of the second plate 120. The touch sensor 150 may be implemented as an electrostatic type or a pressure-sensitive type. A pressure-sensitive touch sensor may include two electrode plates built into the wireless power transmission apparatus 100, and when the wireless power receipt apparatus 200 comes into contact with a touch sensor, and refer to a touch sensor of a method of calculating touch coordinates by sensing that upper and lower plates of the contact point come into contact and current flows.

When the wireless power receipt apparatus 200 comes in contact with the touch sensor using a dielectric coated on a surface of the wireless power transmission apparatus 100, an electrostatic type touch sensor refers to a sensor of a method of calculating touch coordinates by sensing micro-electricity excited by the wireless power receipt apparatus 200.

In addition, infrared sensing method, surface ultrasonic conduction method, integral tension measurement method, piezo effect method, etc. may be used in identifying the wireless power receipt apparatus 200, and sensing touch coordinates corresponding to a location of the identified of the wireless power receipt apparatus 200.

The processor 140 according to an embodiment of the disclosure may identify an area on the other side of the second plate 120 in which the wireless power receipt apparatus 200 is located based on a sensed data received from the touch sensor 150. The processor 140 may transmit a driving signal for moving the wireless power transmission module 130 to an area to the wireless power transmission module 130.

The processor 140 according to an embodiment may transmit a driving signal for moving the wireless power transmission module 130 to an area to the wireless power transmission module 130 only when a touch is sensed for more than a threshold time based on the sensed data.

For example, it may be assumed that the wireless power receipt apparatus 200 is placed on the other side of the second plate 120 for less than a threshold time. In that configuration, even if the wireless power transmission module 130 is moved, power cannot be supplied to the wireless power receipt apparatus 200, and thus the processor 140 may not transmit a driving signal for moving the wireless power transmission module 130.

As another example, the processor 140 according to an embodiment may transmit a driving signal for moving the wireless power transmission module 130 to an area to the wireless power transmission module 130 only when a touch is sensed for more than a threshold intensity based on the sensed data. For example, when a touch less than the threshold intensity is sensed, the processor 140 may identify that the corresponding touch does not occur as the wireless power receipt apparatus 200 comes into contact with the touch sensor 150, and may not transmit the driving signal for moving the wireless power transmission module.

Figure 6:
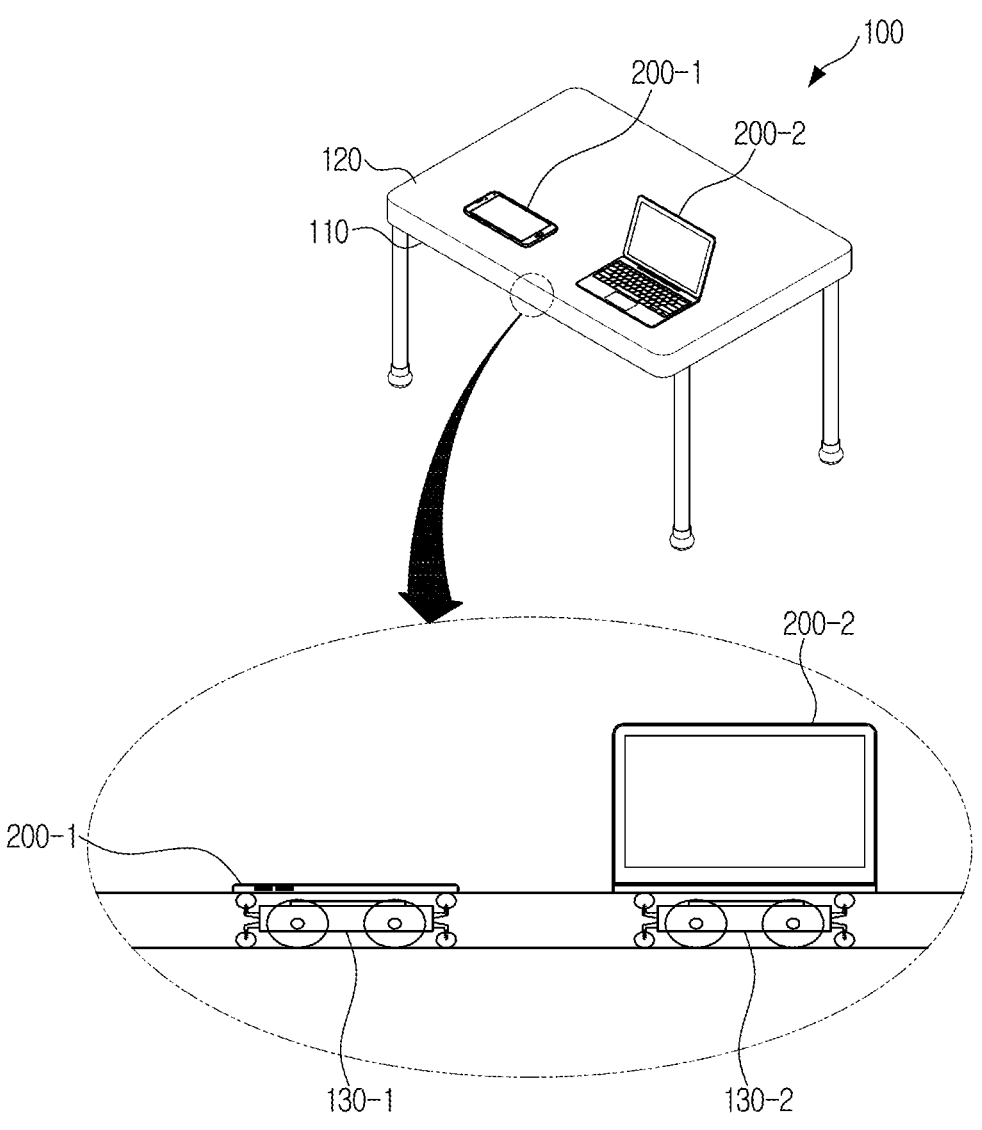
FIG. 6 is a diagram illustrating a plurality of wireless power transmission modules according to various embodiments.

FIG. 6 is a diagram illustrating a plurality of wireless power transmission modules according to various embodiments.

Referring to FIG. 6, at least one wireless power transmission module 130 according to an embodiment of the disclosure may include a plurality of wireless power transmission modules 130-1, 130-2 . . . , 130-n.

When wireless power receipt apparatuses 200-1 and 200-2 are identified in each of a plurality of areas on the other side of the second plate 120, the processor 140 may move the plurality of wireless power transmission modules 130-1, 130-2 . . . , 130-n to the plurality of areas, respectively.

For example, when the first wireless power receipt apparatus 200-1 is identified in a first area on the other side of the second plate 120, the processor 140 may move the first wireless power transmission module 130-1 among the plurality of wireless power transmission modules 130-1 and 130-2 . . . , 130-n to the first area. The processor 140 may supply power to the first wireless power receipt apparatus 200-1 using the first wireless power transmission module 130-1. In addition, when the second wireless power receipt apparatus 200-2 is identified in a second area on the other side of the second plate 120, the processor 140 may move the second wireless power transmission module 130-1 among the plurality of wireless power transmission modules 130-1 and 130-2 . . . , 130-n to the second area. The processor 140 may supply power to the second wireless power receipt apparatus 200-2 using the second wireless power transmission module 130-2.

According to an embodiment, the wireless power transmission apparatus 100 may include n wireless power transmission modules 130-1, 130-2 . . . , 130-n, and move n wireless power transmission modules 130-1, 130-2 . . . , 130-n based on location information of each of the n wireless power receipt apparatuses 200-1, 200-2 . . . , 200-n.

According to an embodiment, the wireless power transmission apparatus 100 may supply wireless power to the wireless power receipt apparatus 200 as many as the number of the wireless power transmission apparatus modules 130. Referring to FIG. 6, the wireless power transmission apparatus 100 may include two wireless power transmission modules 130-1 and 130-2, and supply wireless power by locating the wireless power transmission module 130 at each of the first wireless power receiver 200-1 and the second wireless power receiver 200-2 located on the other side of the second plate 120.

A specific number of wireless power transmission modules 130 is only one example, and the wireless power transmission apparatus 100 may include at least one wireless power transmission module 130 according to a purpose of a manufacturer. In addition, the wireless power transmission module 130 may be added or removed according to the user's convenience. For example, the wireless power transmission module 130 may be additionally placed between the first plate 110 and the second plate 120, and the wireless power transmission module 130 placed previously may be removed.

Figure 7:
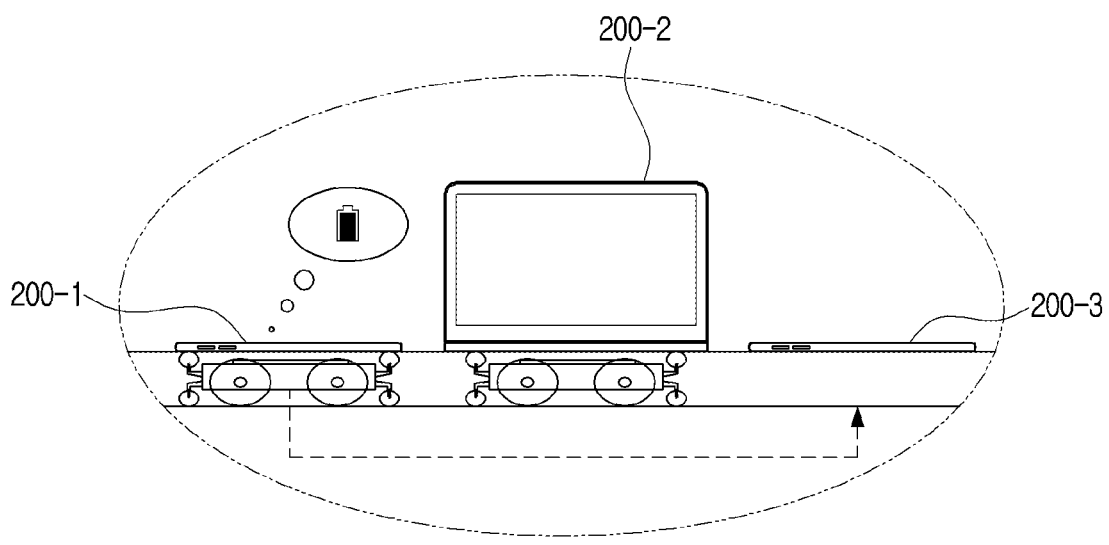
FIG. 7 is a diagram illustrating movement of a wireless power transmission module according to various embodiments.

FIG. 7 is a diagram illustrating movement of a wireless power transmission module according to various embodiments.

Referring to FIG. 7, when a wireless charging of the first wireless power receipt apparatus 200-1 in one area on the other side of the second plate 120 is completed, the processor 140 may move the wireless power transmission module 130 to the other wireless power receipt apparatus (e.g., a third wireless power receiver 200-3) located in the other area on standby.

For example, it is assumed that a larger number of wireless power receipt apparatuses 200 than the number of wireless power transmitting modules 130 are mounted (or located) on the other side of the second plate 120 of the wireless power transmission apparatus 100.

When the wireless power receipt apparatus 200 is identified from the other side of the second plate 120, the processor 140 may locate the wireless power transmission module 130 in a location corresponding to the identified wireless power receipt apparatus 200. The processor 140 may identify the wireless power receipt apparatus 200, which has been wirelessly charged, from among the conventionally identified wireless power receipt apparatus 200-1 and 200-2, when a new wireless power receipt apparatus 200-3 identified from the other side of the second plate 120 in a state in which each of the plurality of wireless power transmission modules 130 is supplying wireless power to the wireless power receipt apparatus 200.

The processor 140 may move the wireless power transmission module 130 located in the wireless power receipt apparatus 200 identified as having completed wireless charging to the new wireless power receipt apparatus 200-3. The processor 140 may control the wireless power transmission module 130 to wirelessly supply power to the new wireless power receipt apparatus 200-3.

As another example, the processor 140 may move the wireless power receipt module 130 based on a priority of each of the plurality of wireless power receipt apparatuses 200-1, 200-2 . . . , 200-n. For example, the processor 140 may identify a priority between the new wireless power receipt apparatus 200-3 and conventionally identified wireless power receipt apparatuses 200-1 and 200-2, when a new wireless power receipt apparatus 200-3 identified from the other side of the second plate 120 in a state in which each of the plurality of wireless power transmission modules 130 is supplying wireless power to the wireless power receipt apparatus 200. When the priority of the new wireless power receipt apparatus 200-3 is higher than that of the conventionally identified wireless power receipt apparatuses 200-1 and 200-2, the processor 140 may move any one of the wireless power transmission modules 130-1 and 130-2 located in the conventionally identified wireless power receipt apparatuses 200-1 and 200-2 to the new wireless power receipt apparatus 200-3. The priority may be determined according to the user's setting or according to the type of the wireless power receipt apparatus 200. As another example, it may be determined according to the remaining amount of power (or the remaining amount of battery) of the wireless power receipt apparatus 200. For example, the processor 140 may give the wireless power receipt apparatus

200 with a relatively low remaining power amount higher priority than the other wireless power receipt apparatus 200.

Figure 8:
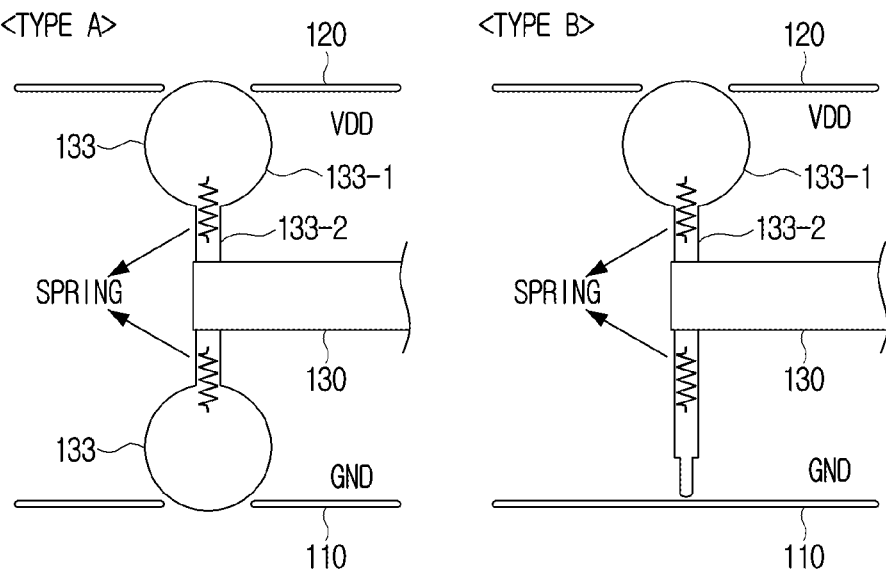
FIG. 8 is a diagram illustrating a connection member of a wireless power transmission module according to various embodiments.

FIG. 8 is a diagram illustrating an example connection member of a wireless power transmission module according to various embodiments.

Referring to FIG. 8, the wireless power transmission module 130 according to an embodiment of the disclosure may be connected to one side of the first plate 110 and one side of the second plate 120, respectively, through the connection member 133.

The connection member 133 may include a fixing part 133-1 and a supporting part 133-2 supporting the fixing part 133-1.

Referring to Type A of FIG. 8, each of the first plate 110 and the second plate 120 may include a plurality of holes arranged in a grid shape.

The fixing part 133-1 included in the connection member 133 of the wireless power transmission module 130 may be located in any one of a plurality of holes, and the supporting part 133-2 may maintain a location of the wireless power transmission module 130 by fixing the fixing part 133-1 to the hole. For example, the supporting part 133-2 may be implemented as an elastic member having an elastic force. When the fixing part 133-1 is located in any one of the plurality of holes, the elastic force of the supporting part 133-2 may fix the fixing part 133-1 to the corresponding hole. Meanwhile, according to an embodiment, the connection member 133 may be located in each corner area of the wireless power transmission module 130 having a rectangular structure. For example, the wireless power transmission module 130 may include four connection members 133. However, this is an example and is not limited thereto. For example, the wireless power transmission module 130 may be implemented in various shapes instead of a rectangular structure, and the wireless power transmission module 130 may include at least one connection member 133.

According to Type A of FIG. 8, the supporting part 133-2 of the wireless power transmission module 130 may fix the fixing part 133-1 to the holes of the first plate 110 and the second plate 120, respectively. Meanwhile, the connection member 133 may be implemented with a material that can be connected to one side of the first plate 110 and one side of the second plate 120 to receive power.

Referring to Type B of FIG. 8, the first plate 110 according to another embodiment of the disclosure may be implemented as a conductive plate that does not include a plurality of holes. In that configuration, the fixing part 133-1 included in the connection member 133 of the wireless power transmission module 130 may be located in any one of a plurality of holes included in the second plate 120, and the supporting part 133-2 may maintain a location of the wireless power transmission module 130 by fixing the fixing part 133-1 to the hole.

When the fixing part 133-1 is fixed to the other one of the plurality of holes according to the movement of the wireless power transmission module 130 in a state in which the fixing part 133-1 is fixed in one of the plurality of holes (or when the fixing part 133-1 moves to the other of the plurality of holes), the supporting part 133-2 may maintain the wireless power transmission module 130 at a location corresponding to the other one of the plurality of holes. For example, the supporting part 133-2 may include an elastic member having an elastic force, such as a spring, and the elastic force may fix the fixing part 133-1 to the hole. As the fixing part 133-1 is fixed to the hole, the wireless power transmission module 130 may maintain its current location in a state in which the driver 131 is not driven.

Figure 9:
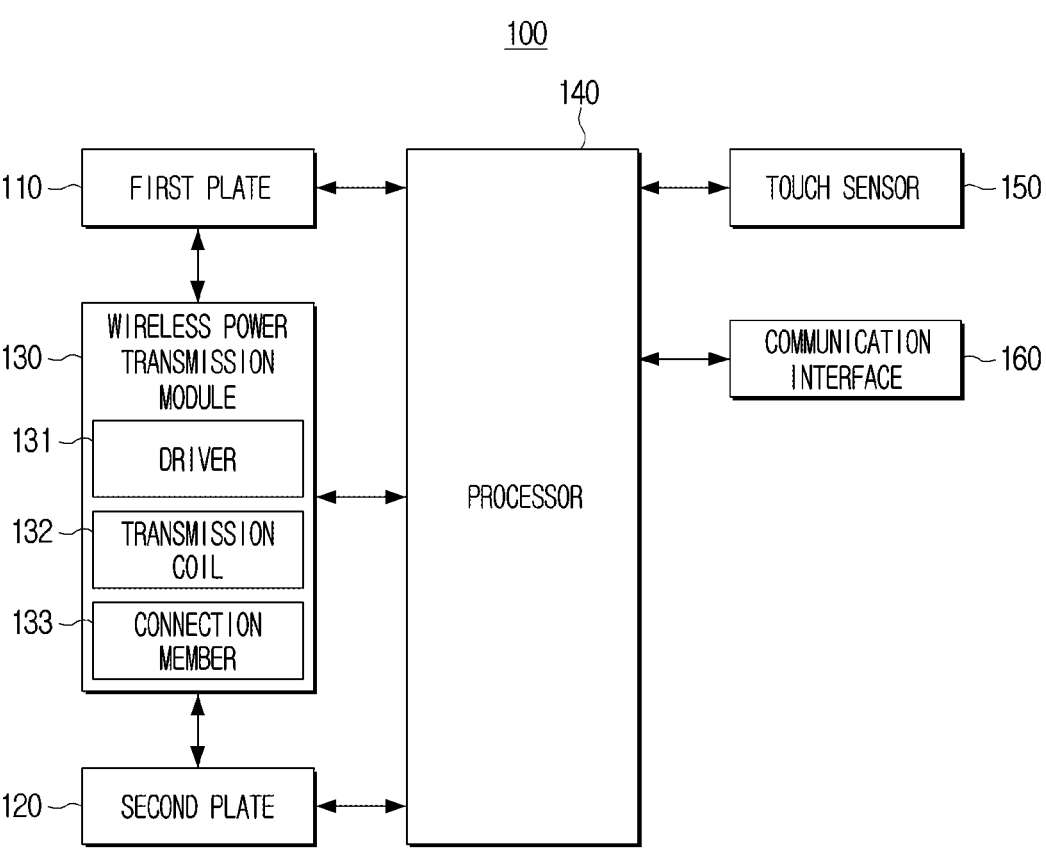
FIG. 9 is a block diagram illustrating an example configuration of a wireless power transmission apparatus according to various embodiments.

FIG. 9 is a block diagram illustrating an example configuration of a wireless power transmission apparatus according to various embodiments.

The wireless power transmission apparatus 100 according to an embodiment of the disclosure may include a first plate 110, a second plate 120, a wireless power transmission module (e.g., including wireless power transmission circuitry) 130, a processor (e.g., including processing circuitry) 140, a touch sensor 150, and communication interface (e.g., including communication circuitry) 160. Descriptions overlapping with those of FIG. 2 may not be repeated here.

The communication interface 160 including a circuit according to an embodiment of the disclosure may communicate with the wireless power receipt apparatus 200. For example, the communication interface 160 may receive various information related o the wireless power receipt apparatus 200 from external device (e.g., wireless power receipt apparatus), an external storage medium (e.g., USB memory), an external server (e.g., web hard drive) through a communication method such as an AP-based Wi-Fi (Wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, or the like.

For example, the processor 140 according to an embodiment of the disclosure may receive location information from the wireless power receipt apparatus 200. For example, the processor 140 may receive location information from the wireless power receipt apparatus 200 located on the other side of the second plate 120. The processor 140 may move the wireless power transmission module 130 to a location corresponding to the wireless power receipt apparatus 200 based on the location information.

The processor 140 according to an embodiment may move the wireless power transmission module 130 based on at least one of sensing data received from the touch sensor 150 or location information received through the communication interface 160.

In addition, the processor 140 according to an embodiment of the disclosure may receive power consumption information from the wireless power receipt apparatus 200. The processor 140 may move the wireless power transmission module 130 based on the received power consumption information.

For example, the wireless power transmission apparatus 100 may include the plurality of wireless power transmission modules 130. There may be a difference in a capacity of wireless power that can be transmitted by each of the plurality of wireless power transmission modules 130. For example, it may be assumed that the first wireless power transmission module 130-1 may transmit 5 W of wireless power, and the second wireless power transmission module 130-2 may transmit 15 W of wireless power. In that configuration, the processor 140 may move, to the location of the wireless power receipt apparatus 200, either the first wireless power transmission module 130-1 or the second wireless power transmission module 130-2 based on the power consumption information received from the wireless power receipt apparatus 200.

As another example, the wireless power transmission apparatus 100 may include the plurality of wireless power transmission modules 130. In that configuration, the processor 140 may identify the number of wireless power transmission modules 130 required for charging or driving the wireless power receipt apparatus 200 based on the power consumption information received from the wireless power receipt apparatus 200. The identified number of wireless power transmission modules 130 may be moved to the location corresponding to the wireless power reception apparatus 200. For example, the processor 140 may locate at least two or more wireless power transmission modules 130 in the wireless power receipt apparatus 200 having relatively high power consumption.

The wireless power transmission apparatus 100 according to an embodiment of the disclosure may include a display (not shown). In addition, the display may be implemented in various types of a liquid crystal display (LCD), an organic light-emitting diode (OLED), a liquid crystal on silicon (LCoS), a digital light processing (DLP), a quantum dot (QD) display panel, and a quantum dot light-emitting diodes (QLED), a micro light-emitting diodes (µLEDs), mini LEDs, or the like.

The display according to an embodiment of the disclosure may display at least one of the location, type, charging state (e.g., charging amount (%), etc.) or priority of the wireless power receipt apparatus 200 identified under the control of the processor 140.

The display according to an embodiment of the disclosure may include a touch panel, and the processor 140 may control the location of the wireless power transmission module 130 based on a user input with respect to the touch panel. For example, the processor 140 may supply wireless power to the wireless power receipt apparatus 200 by moving the wireless power transmission module 130 to a location corresponding to a user input.

As another example, the wireless power transmission apparatus 100 may display at least one of the location, type, charging state (e.g., charging amount (%), etc.) or priority of the wireless power receipt apparatus 200 through its own display, or control an application provided in an external device to display at least one of location, type, charging state (e.g., charging amount (%), etc.) or priority of the wireless power receipt apparatus 200, by performing communication with the external device (e.g., user terminal device) through the communication interface 160.

Figure 10A:
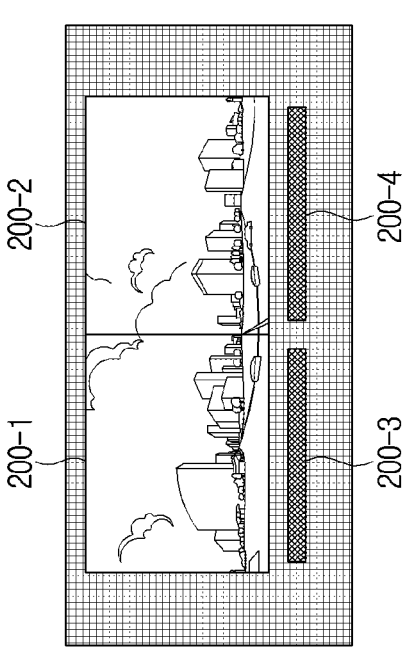
FIG. 10A is a diagram illustrating an example configuration of a wireless power transmission apparatus according to various embodiments.
Figure 10A:
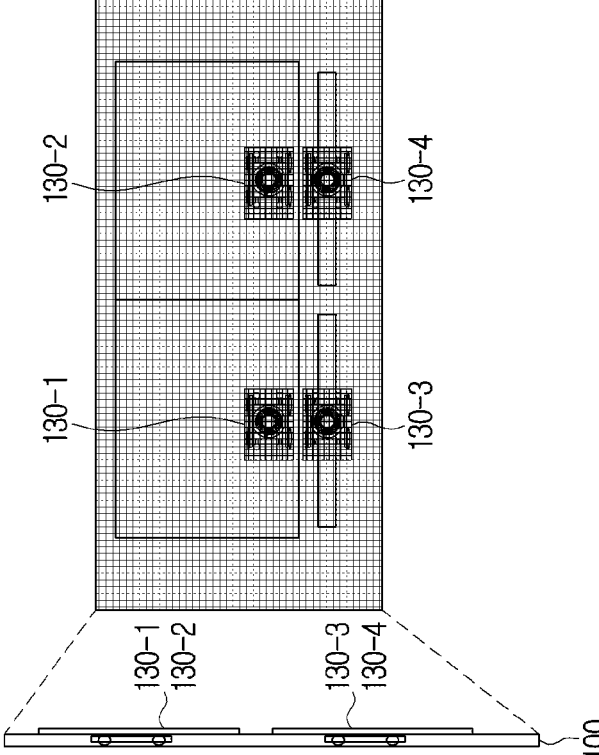

FIG. 10A is a diagram illustrating an example configuration of a wireless power transmission apparatus according to various embodiments.

Referring to FIG. 10A, the wireless power transmission apparatus 100 according to an embodiment of the disclosure may be implemented as a wall-mounted charging cradle in addition to a charging table. FIG. 10A is a view illustrating a side view and a front view of the wireless power transmission apparatus 100 implemented as a wall-mounted charging cradle.

The wireless power transmission apparatus 100 implemented as a wall-mounted charging cradle according to an embodiment of the disclosure may identify a location where the wireless power receipt apparatus 200 is mounted when the wireless power receipt apparatus 200 is mounted. For example, the processor 140 may identify the location where the wireless power receipt apparatus 200 is mounted based on sensing data such as the touch sensor 150 or a sensing sensor provided at each of mountable locations.

The processor 140 may supply wireless power by moving the wireless power transmission module 130 to the identified location.

Referring to FIG. 10A, when first and second modular display devices 200-1 and 200-2 are mounted, the wireless power transmission apparatus 100 may move the first and second wireless power transmission modules 130-1 and

130-2 to locations corresponding to the first and second modular display devices 200-1 and 200-2, respectively.

In addition to the display device, various types of electronic apparatuses may be mounted on the wireless power transmission apparatus 100.

For example, when the first and second sound bars 200-3 and 200-4 are mounted, the wireless power transmission apparatus 100 may move third and fourth wireless power transmission modules 130-3 and 130-4 to locations corresponding to each of first and second sound bars 200-3 and 200-4, respectively.

Meanwhile, when more wireless power receipt apparatuses 200 than the number of wireless power transmission modules 130 provided in the wireless power transmission apparatus 100 are mounted, the wireless power transmission module 130 may be additionally inserted.

The processor 140 according to an embodiment of the disclosure may move the wireless power transmission module 130 corresponding to the electronic apparatus to the corresponding electronic apparatus based on a type of the mounted electronic apparatus, power consumption, or the like. For example, if it is identified as an electronic apparatus requiring relatively high power based on the type of the electronic apparatus, power consumption, etc., the wireless power transmission module 130 capable of transmitting high power among the wireless power transmission modules 130 may be moved to the corresponding electronic apparatus.

Meanwhile, even if the wireless power transmission apparatus 100 is implemented as a wall-mounted charging cradle, a location of the wireless power transmission module 130 may be maintained by fixing the fixing part 133-1 in the hole according to an elastic force, etc. of the supporting part 133-2.

Figure 10B:
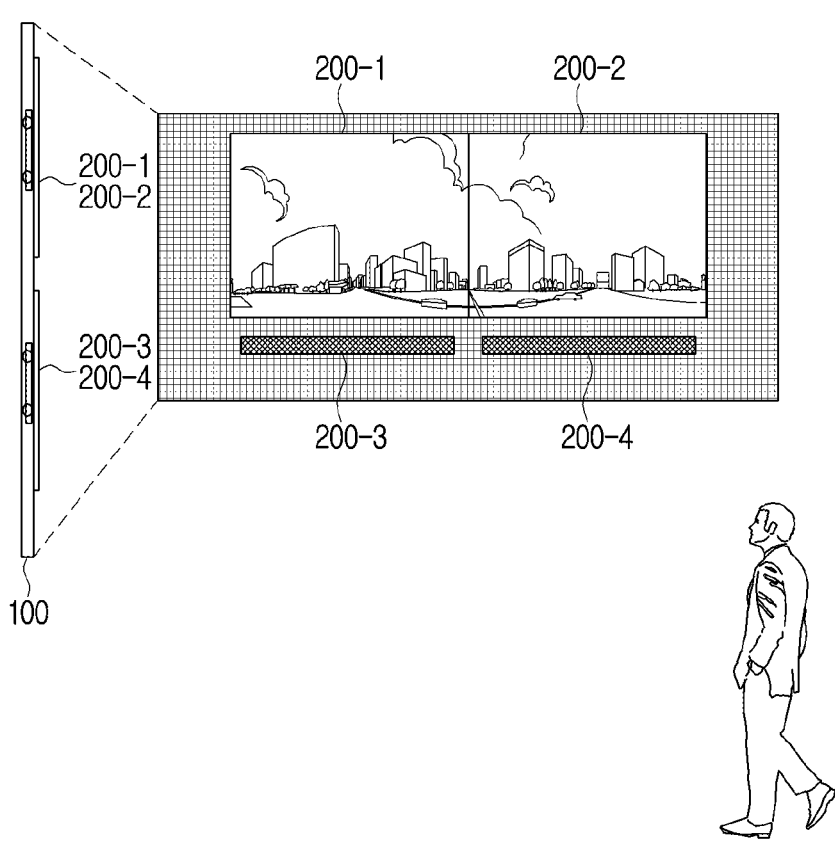
FIG. 10B is a diagram illustrating an example configuration of a wireless power transmission apparatus according to various embodiments.

FIG. 10B is a diagram illustrating an example configuration of a wireless power transmission apparatus according to various embodiments.

FIG. 10B is a side view of the wireless power transmission apparatus 100 according to an embodiment of the disclosure, and a view illustrating that first and second modular display devices 200-1 and 200-2, and first and second sound bars 200-3 and 200-4 are mounted on the wireless power transmission apparatus 100.

Figure 11:
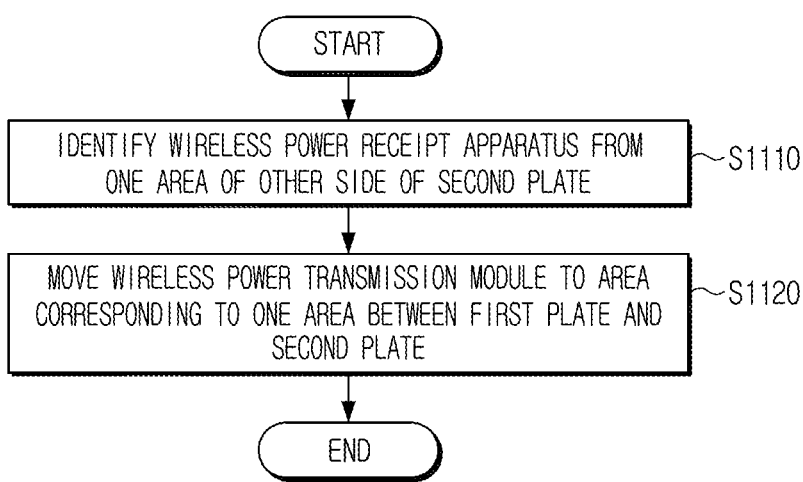
FIG. 11 is a flowchart illustrating an example method of controlling a wireless power transmission apparatus according to various embodiments.

FIG. 11 is a flowchart illustrating an example method of controlling a wireless power transmission apparatus according to various embodiments.

Referring to FIG. 11, a method of controlling a wireless power transmission apparatus including a first plate having a first polarity, a second plate spaced apart from the first plate and having a second polarity different from the first polarity, and at least one wireless power transmission module placed between the first plate and the second plate and connected to one side of the first plate and one side of the second plate, may identify a wireless transmission receipt apparatus from one area of the other side of the second plate (S1110).

The wireless power transmission module may be moved to a location corresponding to one area from between the first plate and the second plate (S1120).

The wireless power transmission module may include a driver receiving power from the first plate and the second plate.

The moving S1120 according to an embodiment may include transmitting, to the wireless power transmission module, a driving signal for moving the wireless power transmission module to a corresponding location.

In addition, the wireless power transmission module may include a transmission coil. A method according to an embodiment may further include transmitting power supplied from the first plate and the second plate to a receiving coil included in the wireless power receipt apparatus through a transmission coil.

The identifying S1110 the wireless power receipt apparatus according to an embodiment may include identifying an area of the other side of the second plate where the wireless power receipt apparatus is located based on sensing data received from a touch sensor placed on the other side of the second plate.

In addition, at least one wireless power transmission module may include a plurality of wireless power transmission modules. The moving S1120 according to an embodiment may include moving the plurality of wireless power transmission modules to a plurality of areas when the wireless power receipt apparatus is identified in each of the plurality of areas on the other side of the second plate.

In addition, the moving S1120 may include moving the wireless power transmission module to the other wireless power receipt apparatus located in the other area on standby, when a wireless charging of the wireless power receipt apparatus in one area on the other side of the second plate is completed.

The moving S1120 according to an embodiment may include moving the wireless power transmission module to a predetermined area between the first plate and the second plate when there is no other wireless power receipt apparatus on standby.

The second plate according to an embodiment may include a plurality of holes arranged in a grid shape, and the wireless power transmission module may be connected to one side of the first plate and one side of the second plate through a connection member, and the connection member may include a fixing part fixed to one of the plurality of holes and a supporting part supporting the fixing part. The method according to an embodiment may further include, when the fixing part is fixed to the other one of the plurality of holes according to a movement of the wireless power transmission module in a state in which the fixing part is fixed to one of the plurality of holes, the supporting part maintains the wireless power transmission module in a location corresponding to the other one of the plurality of holes.

In addition, the method according to an embodiment may further include receiving location information of the wireless power receipt apparatus by performing communication with the wireless power receipt apparatus, and the moving S1120 may include moving wireless power transmission based on the location information.

However, various embodiments of the disclosure may be applied to all types of electronic apparatuses providing wireless power as well as wireless power transmission apparatuses.

Various example embodiments described above may be embodied in a non-transitory computer-readable recording medium that may be read by a computer or a similar apparatus to the computer using software, hardware, or a combination thereof. In some cases, the embodiments described herein may be implemented by the processor itself. In a software configuration, various embodiments described in the disclosure such as a procedure and a function may be implemented as separate software modules. The software modules may respectively perform one or more functions and operations described in the disclosure.

According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium stores data and is available of reading by the device. For example, the non-transitory computer-readable medium may be CD, DVD, a hard disc, Blu-ray disc, USB, a memory card, ROM, or the like.

While the disclosure has been illustrated and described with reference to various example embodiments, it will be understood that the various example embodiments are intended to be illustrative, not limiting. It will be understood by those skilled in the art that many alternatives, modifications, and variations may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wireless power transmission apparatus comprising:
a first lower plate having a first polarity;
a second upper plate spaced apart from the first plate and having a second polarity different from the first polarity, the first and second plates being conductive plates configured to form an electric field region therebetween;
at least one wireless power transmission module disposed in the electric field region between the first plate and the second plate, the at least one wireless power transmission module comprising circuitry electrically connected to the first plate and the second plate and configured to wirelessly transmit power through a transmission coil, wherein the second plate comprises a plurality of holes therein configured to allow magnetic flux produced by the transmission coil to pass through the second plate to a wireless power receipt apparatus on an opposite side of the second plate; and
a processor configured to control the wireless power transmission module,
wherein the processor is configured to, based on the wireless power receipt apparatus being identified in one area on the opposite side of the second plate, generate a driving signal to move the wireless power transmission module along a space between the first plate and the second plate to a location corresponding to the one area.

2. The apparatus of claim 1,
wherein the wireless power transmission module includes a driver configured to receive power from the first plate and the second plate, and
wherein the processor is configured to transmit a driving signal for moving the wireless power transmission module to the location to the wireless power transmission module.

3. The apparatus of claim 1,
wherein the wireless power transmission module includes a transmission coil disposed within the electric field region between the first plate and the second plate, and is configured to transmit power supplied from the first plate and the second plate to a receiving coil included in the wireless power receipt apparatus through the transmission coil.

4. The apparatus of claim 1, further comprising:

a touch sensor disposed on the opposite side of the second plate, wherein the processor is configured to identify the one area on the opposite side of the second plate on which the wireless power receipt apparatus is located based on sensed data received from the touch sensor.

5. The apparatus of claim 1, wherein the at least one wireless power transmission module includes a plurality of wireless power transmission modules, and wherein the processor is configured to, based on the wireless power receipt apparatus being identified in each of a plurality of areas on the opposite side of the second plate, move the plurality of wireless power transmission modules to the plurality of areas, respectively.

6. The apparatus of claim 1, wherein the processor is configured to, based on wireless charging with respect to the wireless power receipt apparatus in one area on the opposite side of the second plate being completed, move the wireless power transmission apparatus module to another wireless power receipt apparatus on standby located in another area.

7. The apparatus of claim 1, wherein the processor is configured to move the wireless power transmission apparatus to a specified area between the first plate and the second plate in the absence of another power receipt apparatus.

8. The apparatus of claim 1, wherein the plurality of holes in the second plate are arranged in a grid pattern, wherein the wireless power transmission module is configured to be connected to one side of the first plate and one side of the second plate through a connection member, wherein the connection member includes a fixing part fixed to one of the plurality of holes and a supporting part supporting the fixing part, wherein the supporting part is configured to, based on the fixing part being fixed to another one of the plurality of holes based on a movement of the wireless power transmission module in a state in which the fixing part is fixed to one of the plurality of holes, maintain the wireless power transmission module at a location corresponding to another one of the plurality of holes.

9. The apparatus of claim 1, further comprising:

a communication interface comprising a circuit, wherein the processor is configured to control the communication interface to communicate with the wireless power receipt apparatus, and move the wireless power transmission apparatus based on location information of the wireless power receipt apparatus received through the communication interface.

10. The apparatus of claim 1, further comprising:

a communication interface comprising a circuit, wherein the at least one wireless power transmission module includes a plurality of wireless power transmission modules, wherein the processor is configured to identify the number of wireless power transmission modules required for charging the wireless power receipt apparatus based on power consumption information of the wireless power receipt apparatus received through the communication interface, and move the identified number of wireless power transmission apparatus modules to a location corresponding to the wireless power receipt apparatus.

11. The apparatus of claim 1, wherein the wireless power transmission apparatus is implemented as at least one of a charging table or a wall-mounted charging cradle having the second plate on a front side and the first plate on a rear side.

12. A method of controlling a wireless power transmission apparatus comprising a first lower plate having a first polarity, a second upper plate spaced apart from the first plate and having a second polarity different from the first polarity, wherein the second plate comprises a plurality of holes therein, the first and second plates being conductive plates configured to form an electric-field region therebetween, and at least one wireless power transmission module disposed in the electric-field region between the first plate and the second plate and electrically connected to one side of the first plate and one side of the second plate, the method comprising:

identifying a wireless power receipt apparatus in one area on an opposite side of the second plate, the plurality of holes in the second plate configured to allow magnetic flux produced by the transmission module to pass through the second plate to the wireless power receipt apparatus on the opposite side of the second plate; and moving the wireless power transmission module along a space between the first plate and the second plate to a location corresponding to the one area, based on the identifying step.

13. The method of claim 12, wherein the wireless power transmission module includes a driver configured to receive power from the first plate and the second plate, and wherein the moving includes transmitting a driving signal for moving the wireless power transmission module to the location to the wireless power transmission module.

14. The method of claim 12, wherein the wireless power transmission module includes a transmission coil, and the method further comprising:

transmitting power supplied from the first plate and the second plate to a receiving coil included in the wireless power receipt apparatus through the transmission coil.

15. The method of claim 12, wherein the identifying the wireless power transmission receipt apparatus includes identifying the one area on the opposite side of the second plate in which the wireless power receipt apparatus is located based on sensed data received from a touch sensor placed on the opposite side of the second plate.

16. The method of claim 12, wherein the at least one wireless power transmission module includes a plurality of wireless power transmission modules, and wherein the moving includes, based on the wireless power receipt apparatus being identified in each of a plurality of areas on the opposite side of the second plate, moving the plurality of wireless power transmission modules to the plurality of areas, respectively.

17. The method of claim 12, wherein the moving includes, based on wireless charging with respect to the wireless power receipt apparatus in one area on the opposite side of the second plate being completed, moving the wireless power transmission apparatus module to another wireless power receipt apparatus on standby located in another area.

18. The method of claim 12, wherein the moving includes moving the wireless power transmission apparatus to a specified area between the first plate and the second plate in the absence of another wireless power receipt apparatus.

19. The method of claim 12, wherein the plurality of holes are arranged in a grid pattern, wherein the wireless power transmission module is configured to be connected to one side of the first plate and one side of the second plate through a connection member, wherein the connecting member includes a fixing part fixed to one of the plurality of holes and a supporting part supporting the fixing part, wherein the supporting part is configured to, based on the fixing part being fixed to another one of the plurality of holes according to a movement of the wireless power transmission module in a state in which the fixing part is fixed to one of the plurality of holes, maintain the wireless power transmission module at a location corresponding to another one of the plurality of holes.

20. The method of claim 12, further comprising:

receiving location information of the wireless power receipt apparatus by performing communication with the wireless power receipt apparatus, and wherein the moving includes moving the wireless power transmission module based on the location information.

* * * * *